United States Patent [19]
Burns et al.

[11] Patent Number: 4,544,964
[45] Date of Patent: Oct. 1, 1985

[54] STROBE FOR READ/WRITE CHAIN

[75] Inventors: Kenneth R. Burns; Robert L. Hazel, both of Winnipeg, Canada

[73] Assignee: Burroughs Corporation, Detroit, Mich.

[21] Appl. No.: 207,311

[22] Filed: Nov. 17, 1980

Related U.S. Application Data

[63] Continuation of Ser. No. 83,411, Oct. 10, 1979, , which is a continuation of Ser. No. 880,721, Feb. 24, 1978.

[51] Int. Cl.[4] .............................................. G11B 5/09
[52] U.S. Cl. .................................................... 360/51
[58] Field of Search ...................... 360/39, 40, 41, 42, 360/43, 51

[56] References Cited

U.S. PATENT DOCUMENTS

| | | | |
|---|---|---|---|
| 3,524,172 | 8/1970 | Hibner | 360/51 |
| 3,537,084 | 10/1970 | Behr | 360/51 |
| 3,864,735 | 2/1975 | Davis et al. | 360/51 |
| 4,009,490 | 2/1977 | Fassbender | 360/51 |

Primary Examiner—Vincent P. Canney
Attorney, Agent, or Firm—John J. McCormack; Nathan Cass; Kevin R. Peterson

[57] ABSTRACT

A principle embodiment teaches a strobing method and associated apparatus for magnetic recording/detecting systems especially adapted for use in high performance, high capacity, low cost disk drives wherein there is provided strobing means adapted to produce a chain of timing pulses and to distribute them relatively uniformly across a data cell of variable length and so provide a sampling means for such cells.

30 Claims, 14 Drawing Figures

STROBE FOR READ/WRITE CHAIN

This is a continuation of application Ser. No. 083,411, filed Oct. 10, 1979, which is in turn, a Continuation of Ser. No. 880,721, filed on Feb. 24, 1978.

BACKGROUND, FEATURES OF INVENTION

The present invention relates generally to information recording and/or reproducing systems; more particularly it relates to improved strobing methods and means adapted for magnetic recording and detection systems.

The present invention will be understood as commonly useful with magnetic disk recording and reproducing systems wherein one or more read/write heads are employed for data storage. Such systems are typically employed to provide auxiliary data storage in an automatic data processing system—with the data being recorded on the concentric circumferential tracks about a disk.

Particulars of a preferred disk drive system and associated servo apparatus and data encoding may be found in copending U.S. patent application Ser. No. 847,012 filed on Oct. 31, 1977, now U.S. Pat. No. 4,149,200 by Daniel Card and commonly assigned herewith. This application is incorporated herein by reference. One purpose of this case is to teach improved strobing for a read/write arrangement used in a high performance, high capacity, low cost (per megabyte) recording equipment.

Workers will appreciate that such equipment presents certain problems, especially when implemented with a servo data format technique like that of the cited application (i.e., "embedded servo" data). In such instances, one must typically resort to using transducer core gaps which are relatively narrow. This, in turn, introducers such problems as reduced "read-signal amplitude" (and a lower signal/noise ratio), increased "adjacent track interference" and increased error from read-data decoding.

Also, "track overhead" is likely increased, requiring higher bit density (bpi). This, in turn, leads to pulse crowding which causes further reduction in read-signal amplitude (and in signal/noise), as well as increased peak shift. This invention is intended to alleviate such problems in an improved strobe arrangement.

Workers in the art are familiar with various methods for (coarse and fine) servo positioning—such as the methods described in the cited application. For instance, workers have used specially selected servo encoding patterns recorded along servo-sector portions of each track to indicate coarse and fine positioning signals. Each such servo sector may contain a servo code including: a common reference transition, followed by "track-follow" servo data (e.g., for providing fine positioning with respect to two adjacent tracks); this followed by "track-seek" servo data to control coarse positioning of the transducer head. The present invention will be seen as apt for combination with such an ("embedded") servo format (e.g., see U.S. Pat. No. 4,027,338 to Kril)—as opposed to a "dedicated" (sector or track) format. Workers will appreciate that an "embedded" format presents certain problems, since track density and/or bit density are increased. This invention addresses those problems.

More particularly, the instant features will be seen as especially apt for use with a certain servo data format (see cited application). In this format, the fine servo data which comprises a "reference transition" followed by another opposite polarity transition at either a first or second position of each track depending on whether the track is odd or even—thus recording an odd or even indicium at respective different relative located positions on adjacent tracks. And, in such a format, the "coarse" servo data comprises a track-group identification code in a series of successive data cells, each cell containing a single magnetic transition representing either a binary "0" or "1" depending on whether the transition occurs in the first or second half of the cell. Preferably, this "course" pattern employs a specially chosen sequence, such as a Gray code sequence, permitting only one change in the (magnetic transition) code between adjacent tracks. Also, such a code is preferably laid-down and manipulated so that a "between track" condition is readily detectable, and results in detected pulses being obtained in both the first and second portions of the "changed cell".

Workers will understand that preferred embodiments of this invention will provide a high performance, high capacity, low cost (per megabyte unit) system; one able, for instance, to increase the data capacity of a conventional disk storage system. Workers will also appreciate that these advantages are achieved using relatively conventional, readily available subsystems. For instance, disk systems improved by the taught features will be seen to provide a very high density of useable bits (for a record with a "several hundred megabyte" capacity, the order of several megabytes, or more, per square inch is feasible, for example)—preferably in a relatively compact low-cost configuration (e.g., of one to two dozen cubic feet, costing just a few dollars per megabyte), along with very reasonable access-to-data times (e.g., the order of about three dozen ms.).

PROBLEM OF "NOISE"

According to one particular feature, the problem of noise-generated read-out error is addressed. Those skilled in the art will readily recognize that (what is generally called) "noise" can introduce errors in the detection of magnetic bits—noise arising from such causes as a faulty head-media relation, adjacent track interference, or noise arising in the amplifier, filter or conversion stages of a digital read-out chain.

For instance, refer to FIG. 3 where curve 3-A will be understood as reflecting a theoretically "pure" analog data signal having no "noise", and signal 3-A' its digital counterpart, as well known in the computer arts. Now, by comparison, signal 3-B represents a composite signal of the same data from a high-amplitude carrier as distorted by a typical noise wave. Signal 3-C represents a low-amplitude output signal as distorted by a similar typical noise pattern—with signals 3-B', 3-C' representing the similar digital output counterparts respectively (the "strobe" being indicated at Roman numerals I and II, as known in the art).

Thus, the strobing of digital output 3-A' will indicate a "zero one" bit sequence. The strobing of digital output 3-B' will indicate the same (although the distortion here will be seen as approaching a "danger" point). Strobing of digital output 3-C' will be seen as very ambiguous—either bit being interpreted as a "ZERO" or a "ONE".

The present invention addresses the above, and like, needs and problems in a novel improved strobe arrangement.

BRIEF DESCRIPTION OF THE DRAWINGS

The foregoing and other objects, features, advantages and uses of the invention will become apparent from the following description of preferred embodiments, taken in conjunction with the accompanying drawings wherein like reference symbols denote like elements and in which:

FIG. 7 shows block-diagram details of the "phase-lock loop" portion thereof; while;

FIG. 8 is a preferred circuit implementing prestressing, precompensation elements of FIG. 4;

FIG. 9 comprises amplification and programmable attenuation elements of FIG. 5; FIG. 10 comprises cross-over detection elements of FIG. 5; FIG. 11 comprises differentiator, video amplifier and servo amplifier means; FIG. 12 comprises PLL elements, namely the phase-select means of FIG. 7; FIG. 13 comprises phase detect, filter, VCO and TPG means of FIG. 7, and certain elements of FIG. 6; and FIG. 14 comprises the discriminator elements of FIGS. 4 and 6.

DESCRIPTION OF PREFERRED EMBODIMENTS

Figure 1:
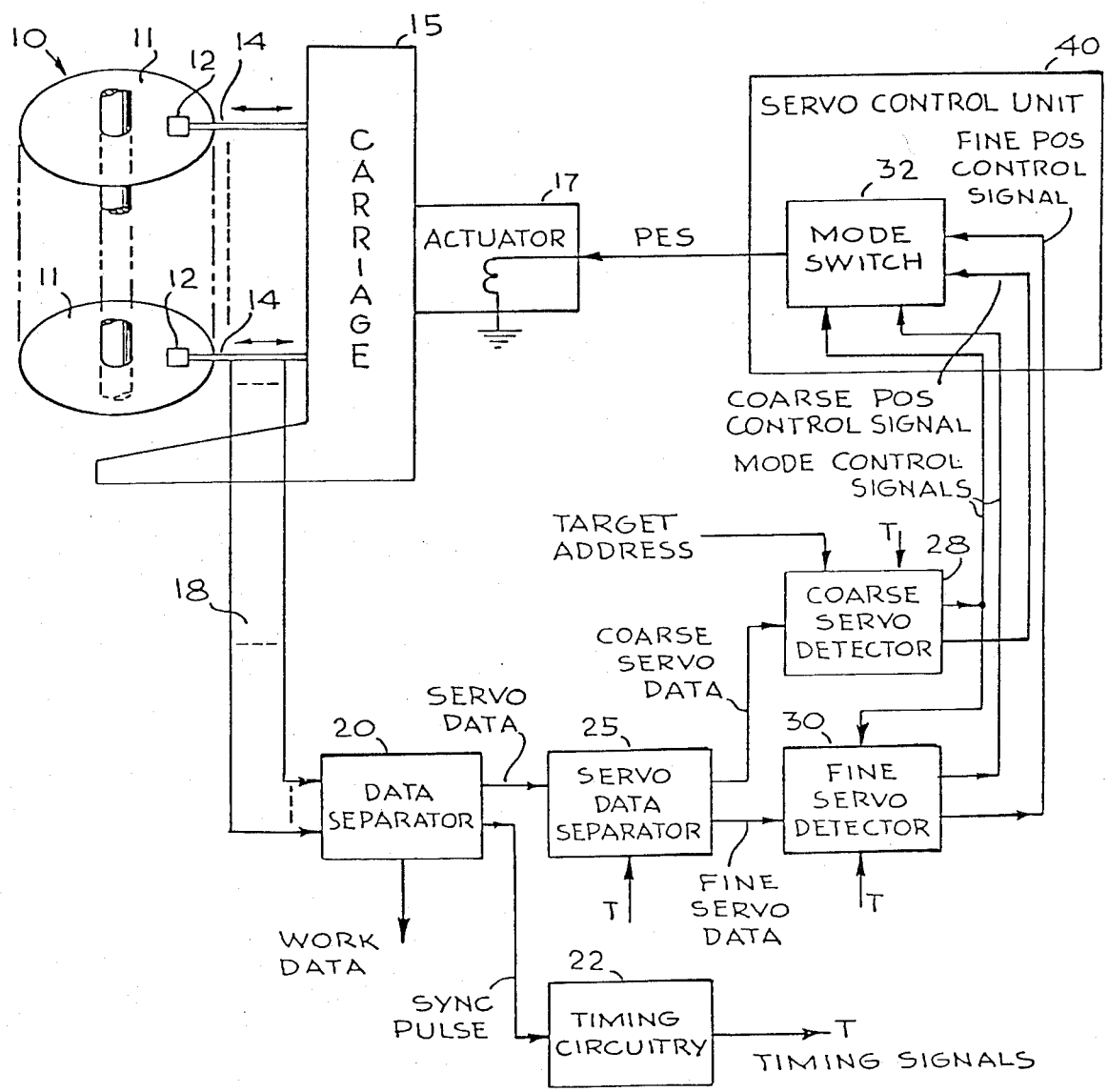
FIG. 1 depicts a known disk drive arrangement showing various data handling and related control functions in block diagram form; with FIG. 2A showing, in plan view, a fragmentary schematic illustration of an associated magnetic recording disk, with data format indicated.
Figure 2A:
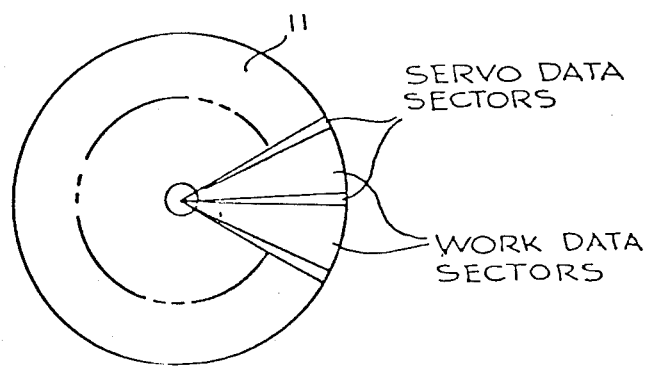
Figure 3:
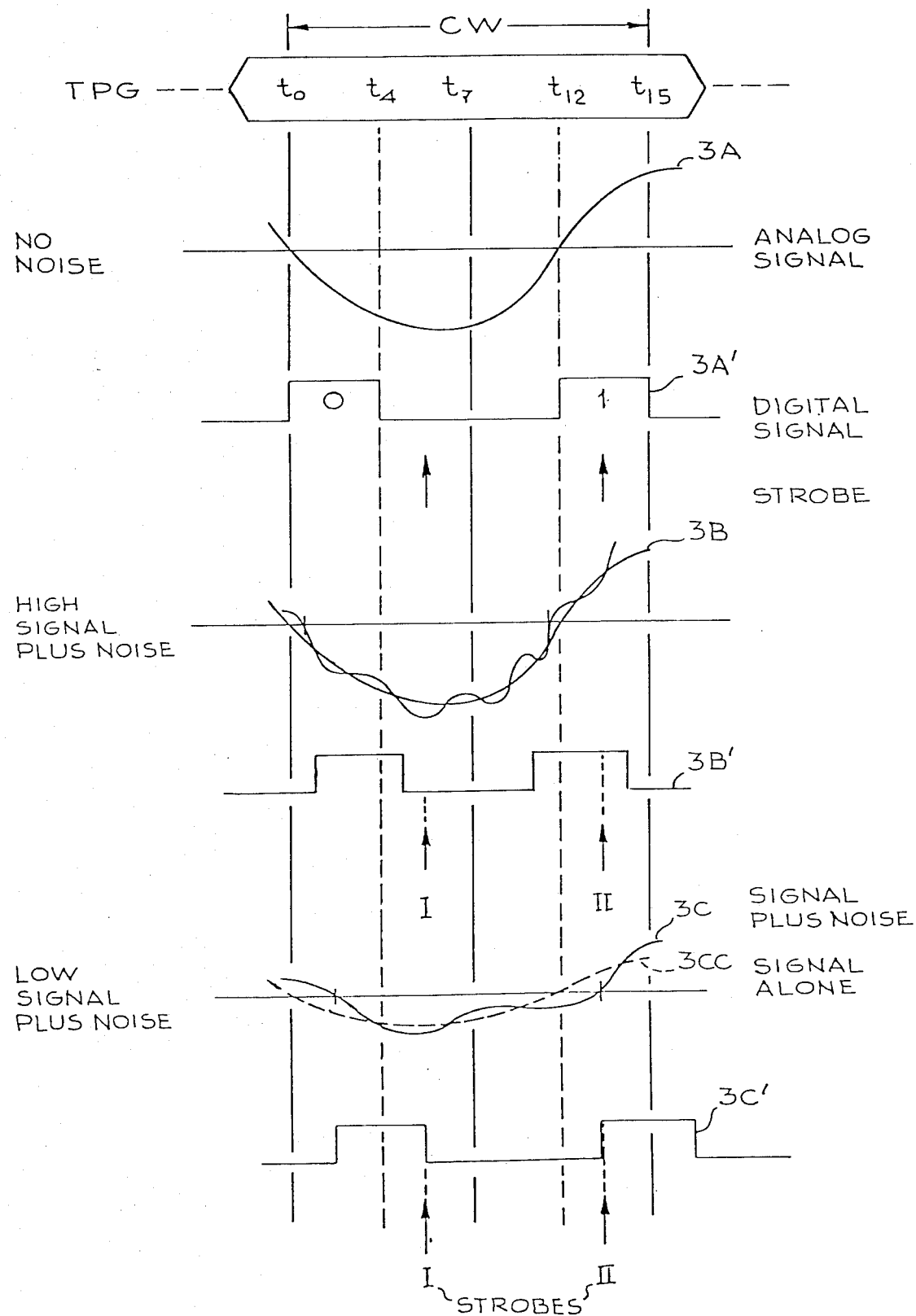
FIG. 3 is an idealized illustrative representation of a one-cycle sample readout signal in "data-cell" form, represented by various noise-effected waveforms.

Workers will understand that, except as otherwise expressed herein, elements will be understood as constructed and operating conventionally and as known in the art. Referring now to FIGS. 1 and 2, attention will first be called to a magnetic disk recording system of a known type, such as referred to in the cited U.S. patent application. This system will be seen as comprising a disk pack 10 including one or more rotatable disks 11, each having a respective radially-positionable magnetic transducer head 12 provided and operated as known in the art.

Each disk 11 contains a plurality of concentric annular tracks. As illustrated in FIG. 2, work data and servo data are interspersed on the disk so as to form alternating "work data" sectors and "servo data" sectors. The servo data on each disk is provided to control the radial positioning of the respective disk head 12 in order to permit accessing selected work data tracks for reading and/or writing; for example, as is conventionally performed when a disk system is employed as a peripheral storage unit in a computer system. For the purpose of this description it may be assumed that all of the heads are constructed and arranged to move together, but it will be understood that the present invention could also be applied to a disk system wherein the heads are individually movable. It will also be assumed that only one head and a corresponding disk is selected for reading and/or writing at any one time.

Now, workers will appreciate that, a head positioning carriage 15 is constructed and operated conventionally, being controlled by an actuator 17 that provides for radial positioning of the heads 11. The actuator 17 is, in turn, controlled in response to a positioning control signal "pcs" indicating the "current position" of the head relative to "target position". More specifically, and as schematically illustrated in FIG. 1, data signals read from a selected disk (track) 11 by a selected head 12 are applied, via lines 18, to a Data Separator unit 20 adapted to separate servo and work data based on sector location, and for providing a "cync" signal applied to timing circuitry 22—the latter producing timing signals T which are used relatively conventionally with other elements of the system.

Further details of the disk drive embodiment under contemplation here may be found in the cited copending application. For such a drive, or any related system, the "read operation" will be understood as controlled by a "read/write system" modified according to the invention. When an encoded data signal has been read from a disk by a selected head, it is converted to NRZ (non-return-to-zero) form, under control of a clock signal. The clock is used to transfer the data to the drive controller, as is conventional.

"Write operations" will be understood as controlled by the "read/write" system, with NRZ data transferred from the controller to the drive under the governance of clock pulses. These clock pulses will be understood as preferably derived from the medium as indicated (see cited Application). Data signals are converted to MFM and written on the desired disk segment in synchronition with servo clock signals—the latter compensating for variations in disk rotation, as known in the art (e.g., assuring that a disk written by one drive unit can be read by another drive).

READ-WRITE ARRAY, IN GENERAL: FIG. 4

Figure 4:
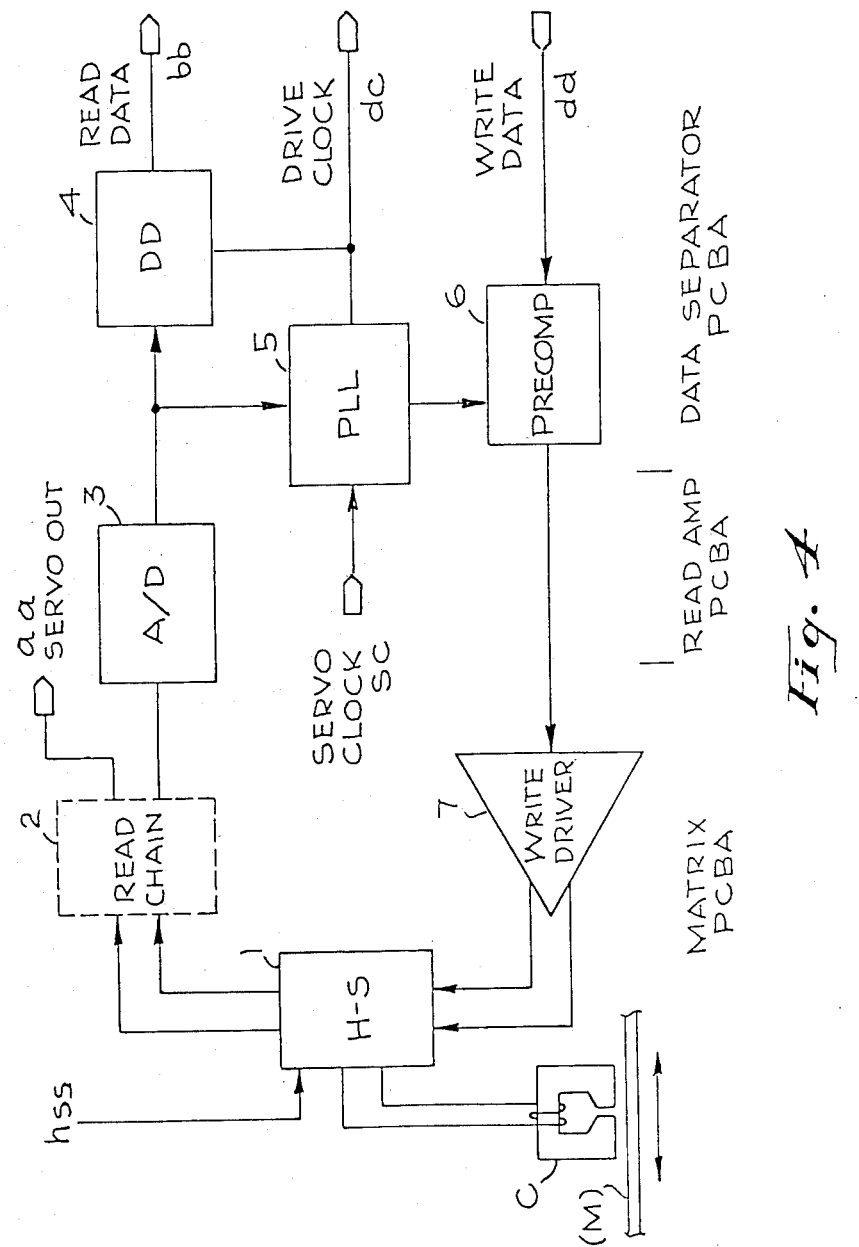
FIG. 4 is a very schematic block diagram of (simplified organization of) a read/write embodiment for use with the invention.

FIG. 4 indicates, in very schematic, general block diagram form, the simplified organization of a read/write embodiment adapted for use with a disk drive like that above-mentioned. This arrangement will be understood as constructed and operated conventionally and as known in the art except as otherwise specified.

Figure 5:
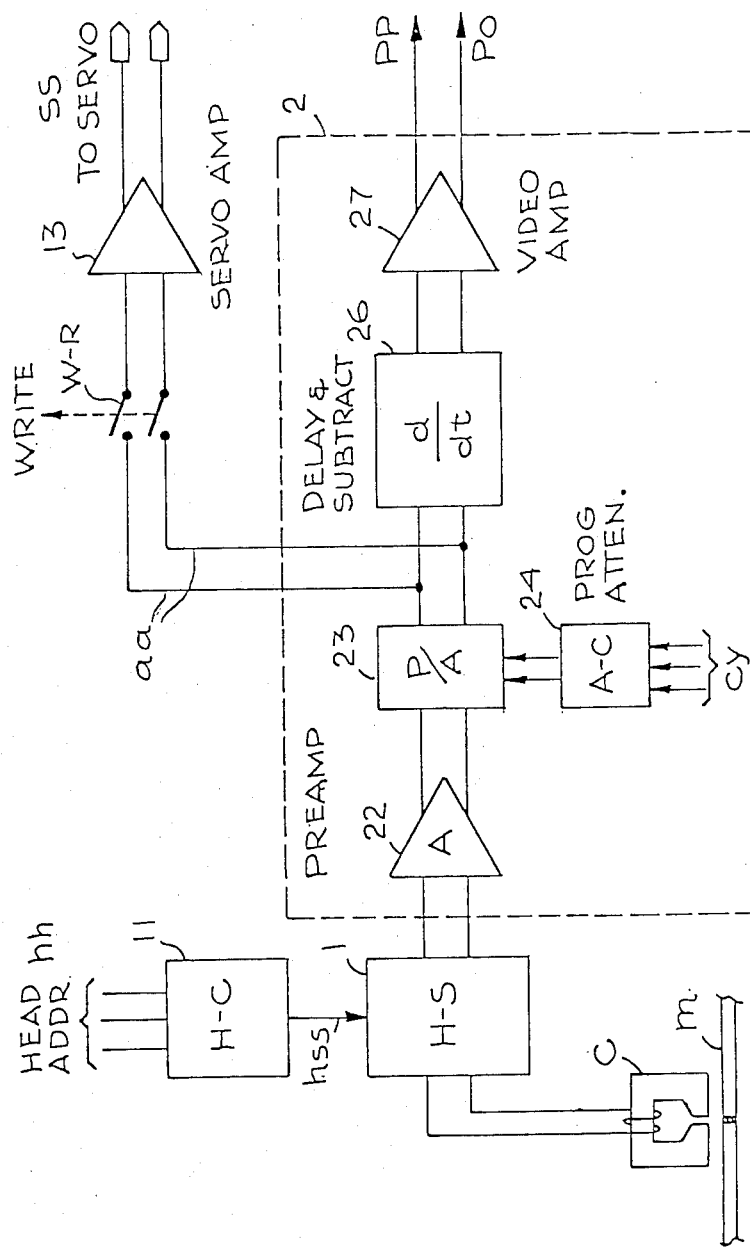
FIG. 5 indicates details of the "read/write chain" portion of the FIG. 4 arrangement in block diagram form; while FIG. 6 indicates block-diagram details of the "data conversion" portion

Thus, a Head-Select stage 1 will be understood as adapted to select a magnetic transducer core (one of eight) for reading in accordance with a "head-select signal" (hss), conventionally generated and applied (see FIG. 5). Upon detection of the (analog) magnetic data/servo output from the medium (M), stage H-S will apply these signals to a "Read Stage" 2 as hereinafter described. Select unit 1 will also be understood as constructed and adapted for selecting and operating an indicated head during "write" operations as known in the art.

Figure 9:
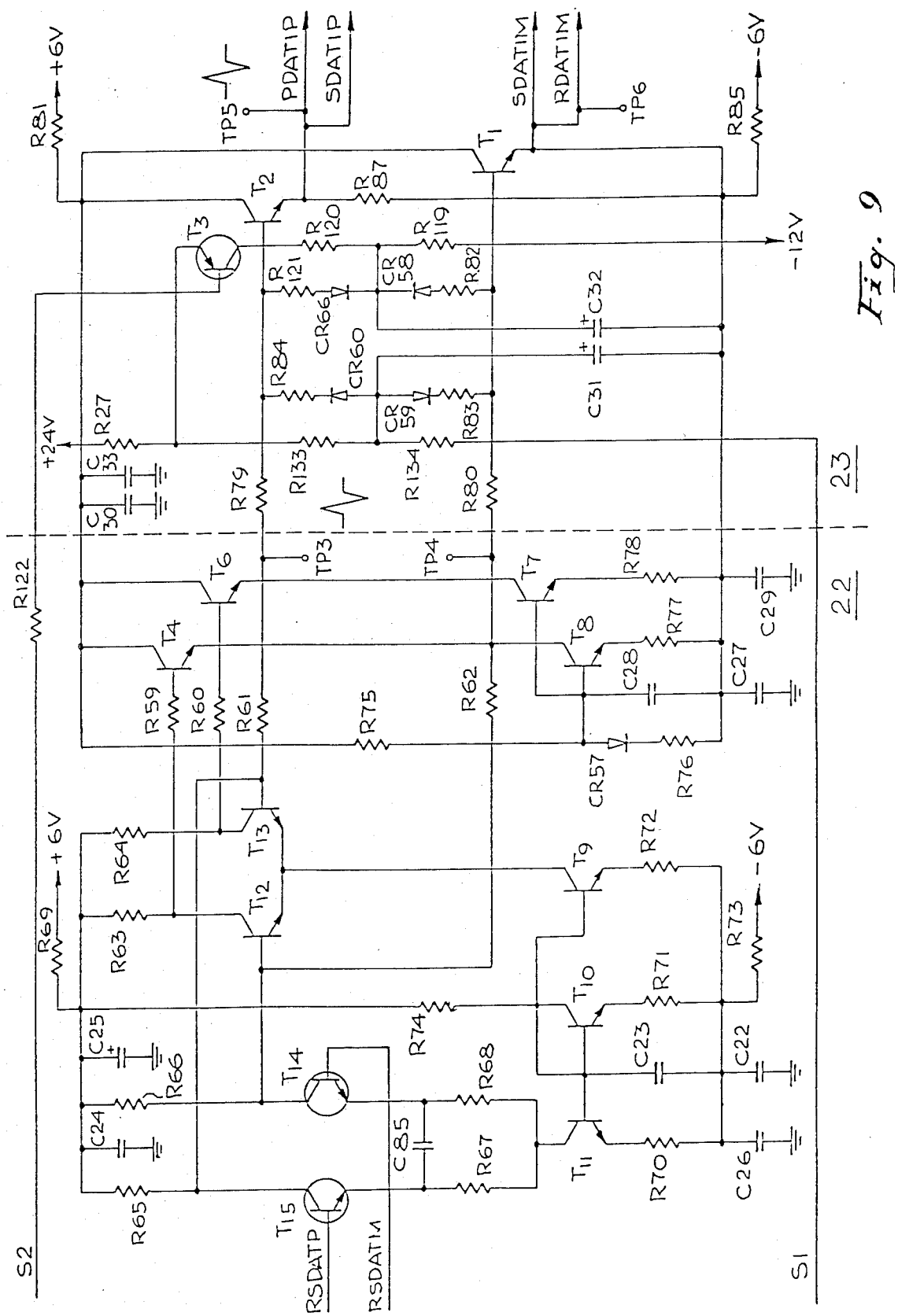

Read stage 2 will be understood as generally adapted to amplify and process these output signals (e.g., time-differentiate them) as more particularly described below, with reference to a preferred circuit embodiment thereof indicated in FIG. 9 (also see associated programmed attenuation as in FIG. 5) and in FIG. 11 (e.g., with video amp and associated LP filter, pulse W-R switch and servo amp—see also FIG. 5). The servo output will be transmitted along the associated output line indicated for servo output signals (aa), while "data output" will be applied to a Converter stage 3.

Converter stage 3 will be understood as generally adapted to shape the data output pulses, converting them to a desired digital form and applying them to a Secondary Converter stage 4. Converter 3 is discussed below in more detail, and, for instance, will be seen as squaring-up and digitizing the data output, and also, preferably converting it to "MFM" code (i.e., "modified frequency modulated", or "edge-referenced", code, preferably using bi-level EC logic as known in the art). Preferred circuit implementation is shown.

Secondary Converter stage 4, converts this MFM digital output (from stage 3) to the well known NRZ code, under control of a "phase-lock loop" circuit (PLL-see stage 5). It is more particularly described below, with a preferred circuit implementation being shown in FIGS. 12 and 14.

This digital conversion will be understood—according to one feature hereof—as performed under the control of the PLL circuit of stage 5—stage 5 providing a predetermined chain of strobe pulses, as further discussed below. This feature will be generally understood to enable "early", "late" and "on-time" strobing of each MFM pulse at any one of several time-divisions (in the pulse cycle), decoding the NRZ bi-level logic thereof (e.g., where a "high" pulse is interpreted as an "NRZ-one"; and a "low" pulse is interpreted as a "NRZ-zero". The advantage of this novel implementation is that it affords a digital, rather than analog, means of introducing a small delay (or advancement) of the srobe time.

Figure 8:
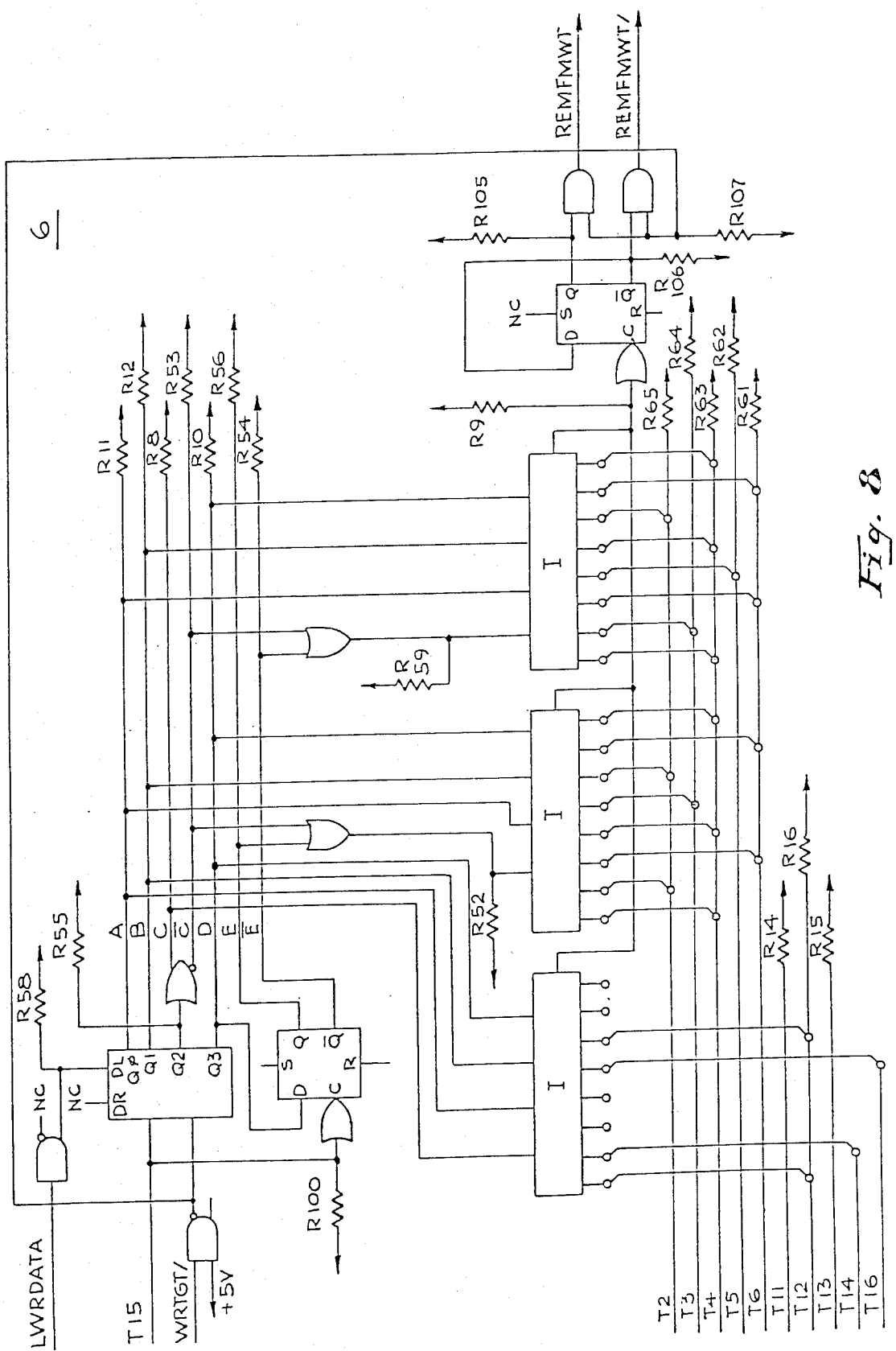
FIGS. 8 through 14 comprise the preferred circuit implementation of salient elements of FIGS. 4–7; i.e.

To "Write" with the arrangement of FIG. 4, it will be undrstood that digital "write data" input pulses "dd" are applied to a Pre-conversion stage 6 which is adapted to encode the usual KRZ signals in MFM code according to another feature hereof. Stage 6 serves to "pro-compensate" for (magnetic) bit displacement and resultant error by a "prestressing" operation—according to a related feature. Such prestressing will be seen as particularly powerful in reducing read-errors, as further discussed below. FIG. 8 shows preferred implementation of such prestress-circuit, using emitter coupled logic (e.g., as opposed to T²L logic).

PROGRAMMED GAIN-ADJUST, DETECTION: FIG. 5

Expanding upon the generalized block diagram of FIG. 4, the block diagram of FIG. 5 particularizes some elements of Read stage 2, with emphasis upon a "programmable gain-adjust" ("attenuation") operation which adjusts "read-out gain" as a function of track location—according to another feature. Thus, it will be understood that Head-Select unit 1 functions to "steer" signals to, and from, a selected transducer core "c" (shown here in schematic operative relation with relatively moving medium segment "m") as controlled by head address signals (hh) which are converted and applied through a conventional conversion unit 11. Head-Select units 1 may preferably comprise a diode matrix, as known in the art, whose output signals are applied to a Preamplifying stage 22 and, then in turn, to a "Programmable attenuation" (P/A) stage 23, according to this feature.

Stage 23 will be understood as controlled and operated to adjust output gain to change in a programmed manner with changing "track location"—for instance, reducing amplification as one proceeds outwardly of a disk (Reading from the innermost to the outermost disk track, and remembering that the increased velocity of the outer tracks increases their readout signal amplitude). "P/A Stage" 23 is an improvement over conventional approaches (e.g., more use of an ordinary AGC stage) to the problem of anticipating "low-amplitude noise", and compensating for it during read-out; yet without increasing gain erroneously and without deterioration of signal/noise. Stage 23 also alleviates the undesirable "gain inertia" usually experienced when shifting quickly from a high-gain "write" mode to a low-gain "read" mode.

It will also be understood that a "Programming" (or A/C) unit 24 is also preferably provided, being adapted to select one of three "data-cylinder zones" (in which the selected disk track falls) and to responsively adjust the read-out gain of attenuator P/A. Of course, a different cylinder sub-division (e.g., 5 cylinders, corresponding to 5 sets of disk track loci) may also be used, as a matter of choice. Thus, it will be recognized that once the system identifies the "attenuation zone" in which a "selected" read-out track falls, read-out gain will be automatically adjusted for optimum intelligibility—according to this feature. FIG. 9 shows a preferred circuit implementation of the amplifier attenuator combination.

The servo signals are suitably amplified at servo amplifier 13, after traversing a "write disconnect" relay W-R, being applied then as servo signals SS to a servo control unit (not shown but known). Relay W-R will be understood as adapted to disconnect servo amplifier 13, etc., during a "write" operation.

Figure 11:
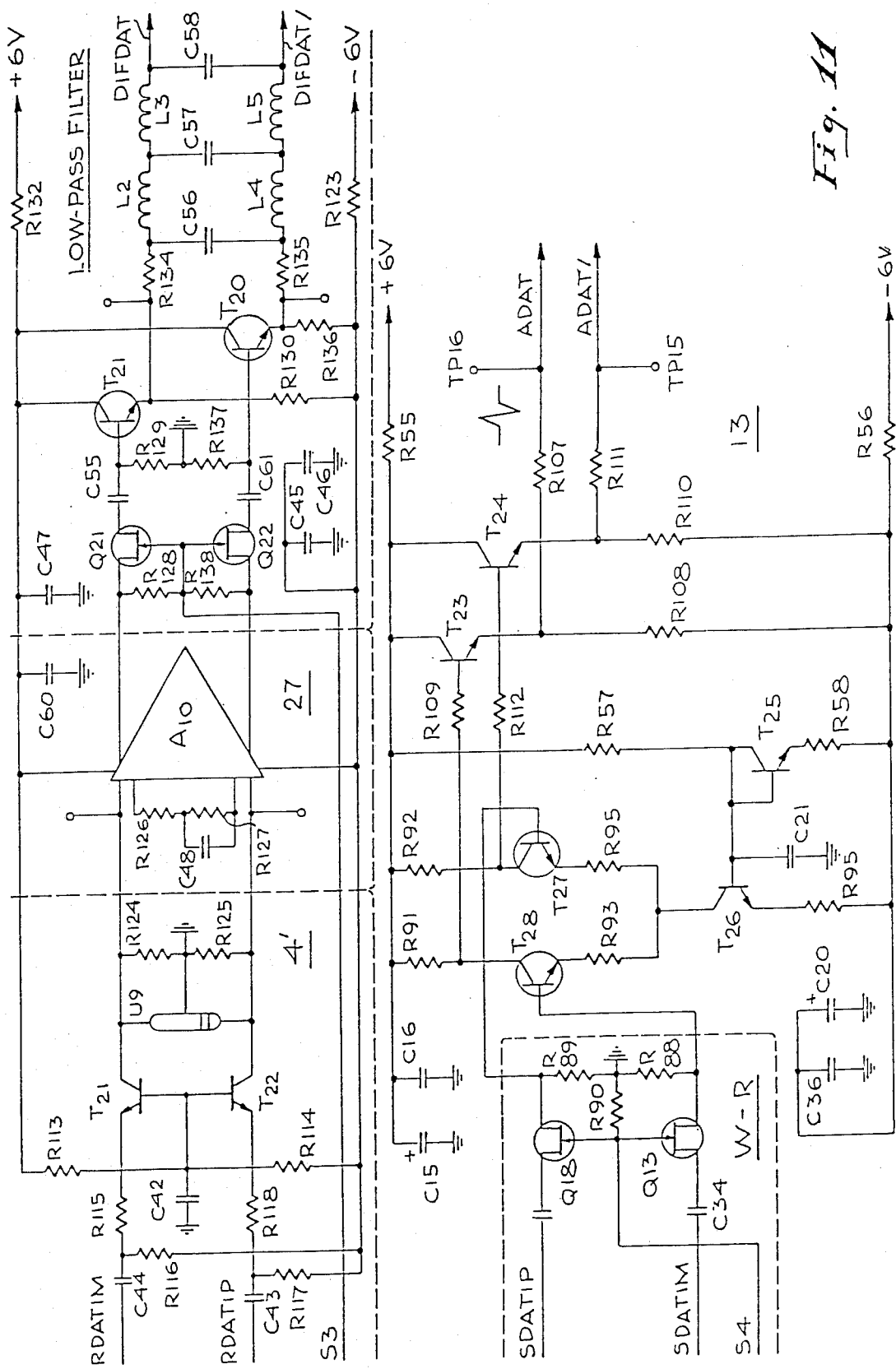

Relay W-R affords protection against "capacitive store" effects (see preferred circuit in FIG. 11 using two FET's, together with a large isolating capacitor—there being no capacitive coupling elsewhere). This circuit will be seen to achieve capacitive coupling, while isolating the system from capacitive store effects.

The output data signals are applied to Delay and Subtract stage 26 which is adapted to convert pulse peaks to a (positive or negative) "cross-over signal" by differentiating them with respect to time. Unit 26 performs a delay/subtract operation wherein a given output signal is compared with a delayed version of its predecessor output and a subtraction performed. (Also see cited U.S. Ser. No. 847,012, now U.S. Pat. No. 4,149,200 and details of similar circuit therein). The output from unit 26 is amplified by a Video Amplifier stage 27 and then applied, as a pair of positive and negative outputs pp, po, to a Crossover Detect unit 31 (see FIG. 6 and discussion below). FIG. 11 indicates preferred circuitry for the Video Amplifier and associated (LP) filter, together with the mentioned W-R switch and servo amplifier.

CROSSOVER DETECT, PRESTRESS, "DESNAKE": FIG. 6

Figure 6:
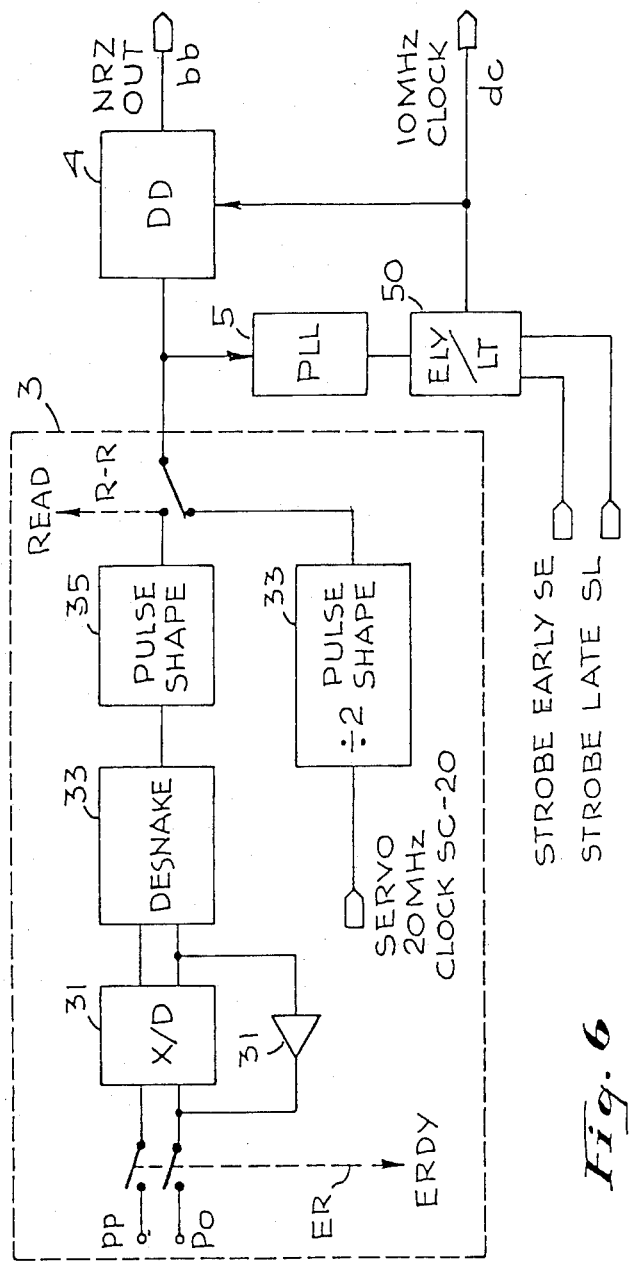

FIG. 6 indicates an expanded version of converter stage 3 in FIG. 4, as associated with related "phase lock" and "discriminator" stages, 5 and 4, respectively. Thus, as mentioned above, pairs of (shaped, encoded, etc.) read-out data pulses (pp, po) are applied from amplifier 27, through relay E-R, to Crossover Detect stage 31. Stage 31, in effecting crossover detection, provides logic transitions in MFM code, as well as performing a level adjust function—according to another feature—wherein unit 31 adjusts input bias level to reflect a "true" zero signal level, compensating for any erroneous internal offset in the crossover detector differential amplifier. This "level adjust" feature can be quite important and is preferably implemented by a feedback loop 31 connected across stage 31. Also, as evident from the "early" and "late" strobe signals [SE, SL respectively] denoted in FIG. 6, such signals are preferably applied to Phase Lock stage 5, via a suitable switching stage 50, in a relatively conventional manner.

Figure 10:
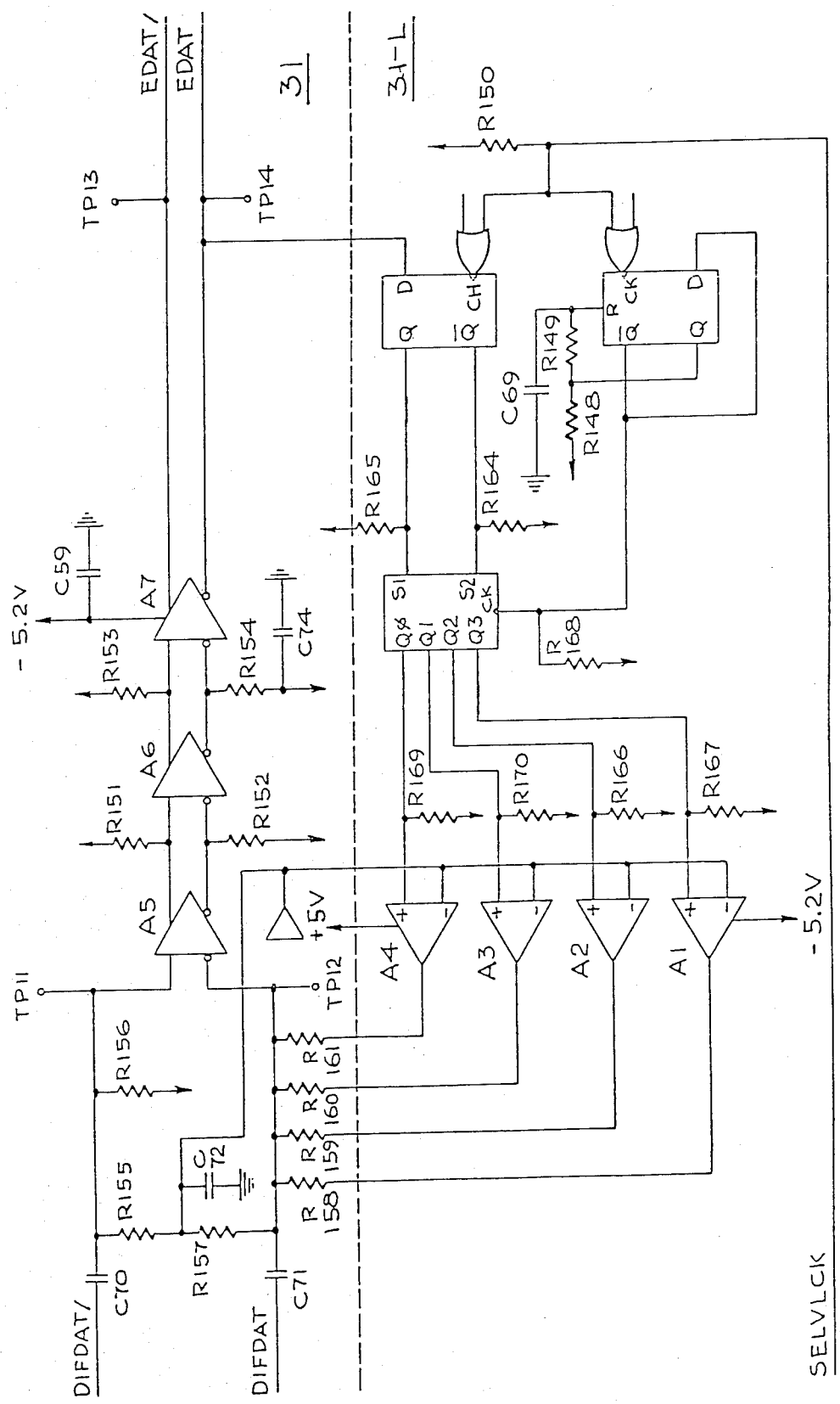

Referring to the preferred circuit implementation in FIG. 10, workers will observe that such detection with prestressing is preferably implemented with "emitter-coupled logic" means ECL, yet using relatively standard components in a rather simple arrangement. Workers will understand that, preferably, resistance values will be selected to reflect "worst case" internal offset values.

The output pulses are then impressed upon a "De-snake" unit 33, adapted—according to a further feature—to filter-out "snake pulses" (i.e., false crossovers) from the read-out pulse train—effecting this by discriminating against all pulses below a certain narrow pulse-width, while passing "true crossover" pulses which are relatively wider. The "de-snaked" output is then applied to Pulse Shaper unit 35, adapted to emit a prescribed "squared" output pulse for each "down edge" applied thereto. (Of course, this logic may be reversed to initiate upon an "up edge", as workers can appreciate).

Figure 14:
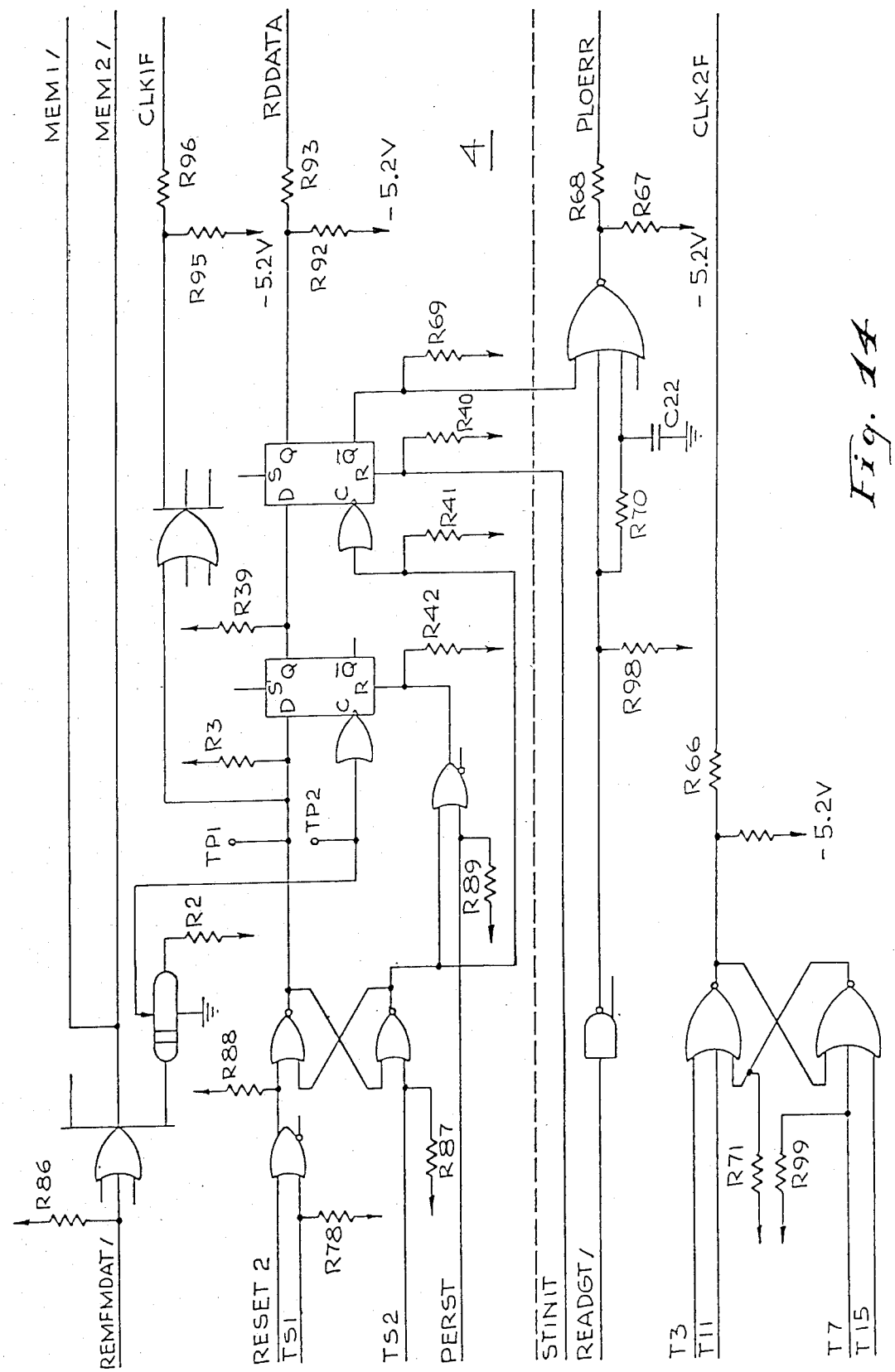

The resultant output is then applied across relay R-R to Discriminator stage 4 (discussed above) and Phase-Lock Loop unit 5 (see below re FIG. 7). A Pulse Shaper unit 33-S receives servo pulses SC-20 (from a 20 MHz servo clock) and performs a frequency-division (dividing by 2, here) and a shaping function. Actuation of relay R-R will apply the output from Shaper 33 to Discriminator 4 and Phase-Lock Loop stage 5. Preferred circuitry implementing such a data discriminator (decoder) is indicated in FIG. 14.

ZERO/ONE SELECT, PHASE-LOCK LOOP (FIG. 7)

In general it will be understood that a Phase-Lock Loop (PLL) stage (unit 5) functions here—according to another feature—to generate a prescribed set of strobe pulses controlling the proper detection of the mentioned MFM read-out pulses. Unit 5 will also be seen to initiate prescribed clock pulses "dc" for the disk drive (a 10 MHz clock).

Figure 7:
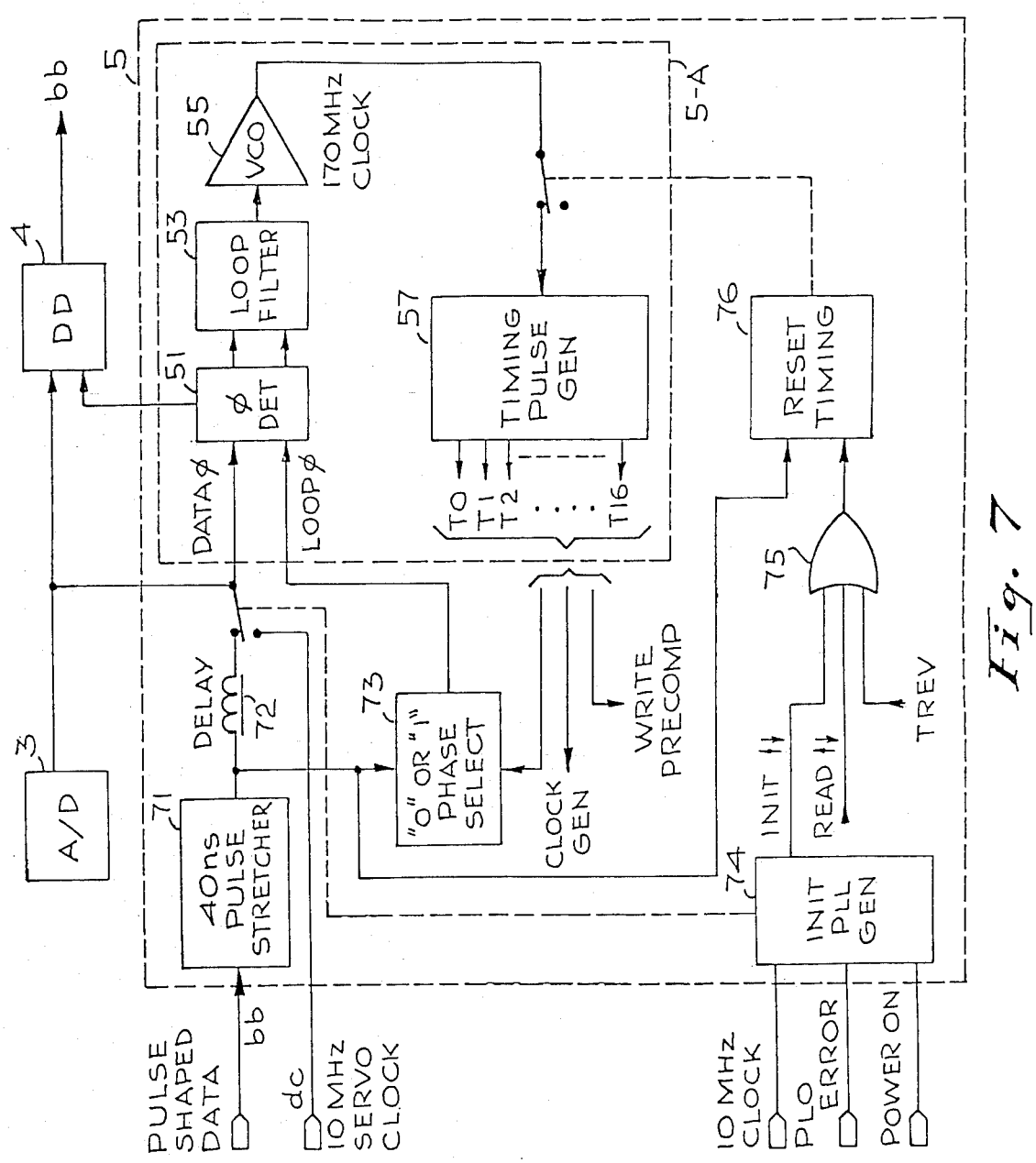

FIG. 7 is an expanded block diagram indicating pertinent details of the PLL unit 5, more generally indicated in FIGS. 4 and 6. Here, the (shaped) data pulses "bb" will be understood as applied, initially, to a Pulse-Stretching unit 71 adapted to shape and stretch the pulses, "normalizing" their length to a uniform "one-half nominal cell width" (here, of 45 nanoseconds duration). The resultant output is applied, through a prescribed delay 72 and a (clock-signal referencing) relay, to a Phase Detect unit 51.

Figure 12:
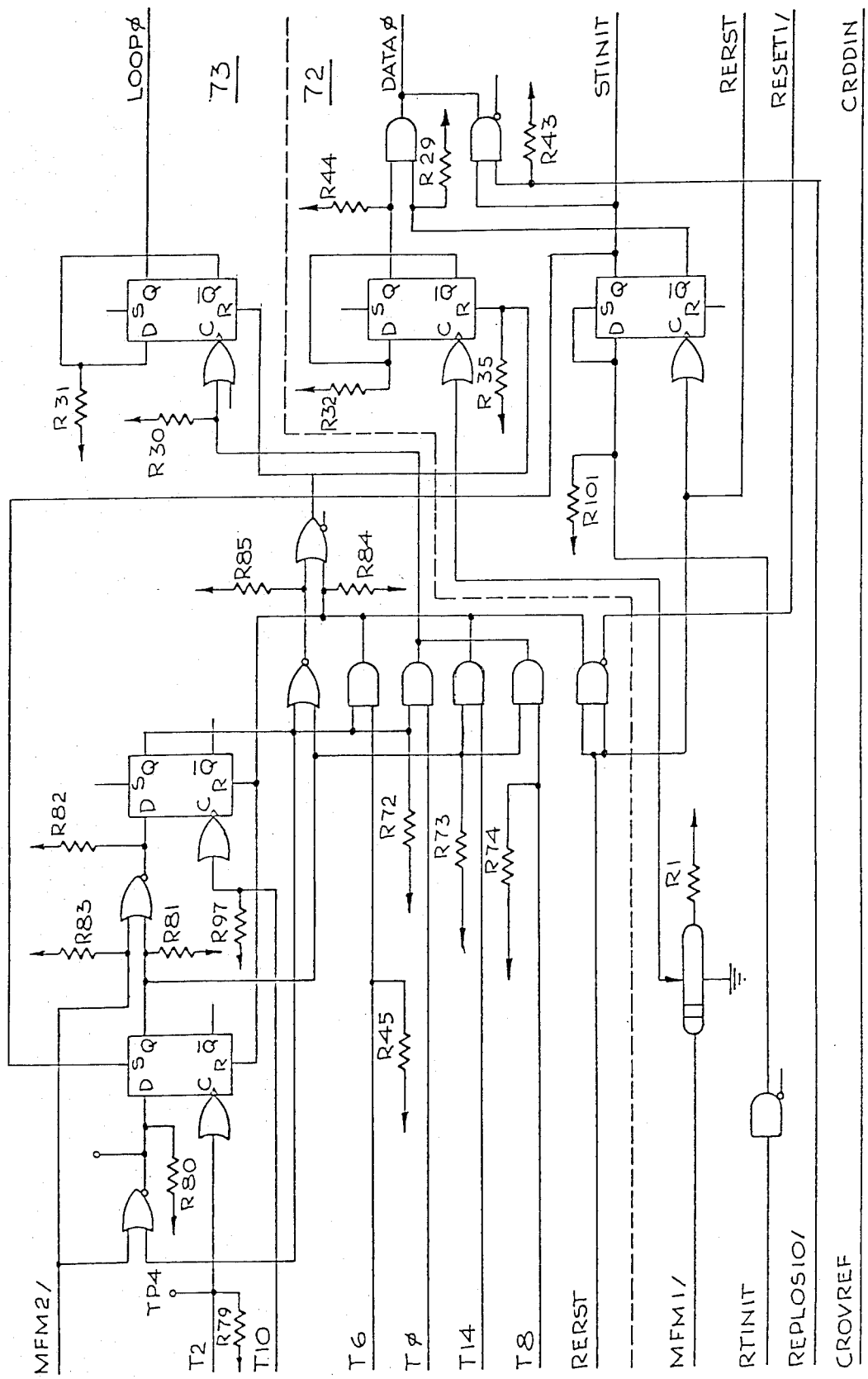

Unit 51 operates to compare the phase of the received data pulses with that of pulses in a ("VCO") phase feedback loop. This VCO loop consists of a filter 53, a voltage-controlled oscillator unit (VCO) 55, a timing pulse generator (TPG) unit 57 and a "Zero/One" Phase Select unit 73. The loop's output is applied (recirculated) in feedback fashion, to Phase Detect unit 51, as workers in the art will understand. A preferred circuit implementing these delay and phase-select functions is indicated in FIG. 12.

VCO clock 55 preferably comprises a known type (—e.g., preferably generating 170 pulses per second, each pulse about 10 nanoseconds long), with resynchronizing capability (e.g., each time a new servo sector is read). A Reset-Timer unit 76 is also provided and adapted to reset ("clear") the TP generator 57 to "clear" and to be "restarted", as known in the art.

Figure 13:
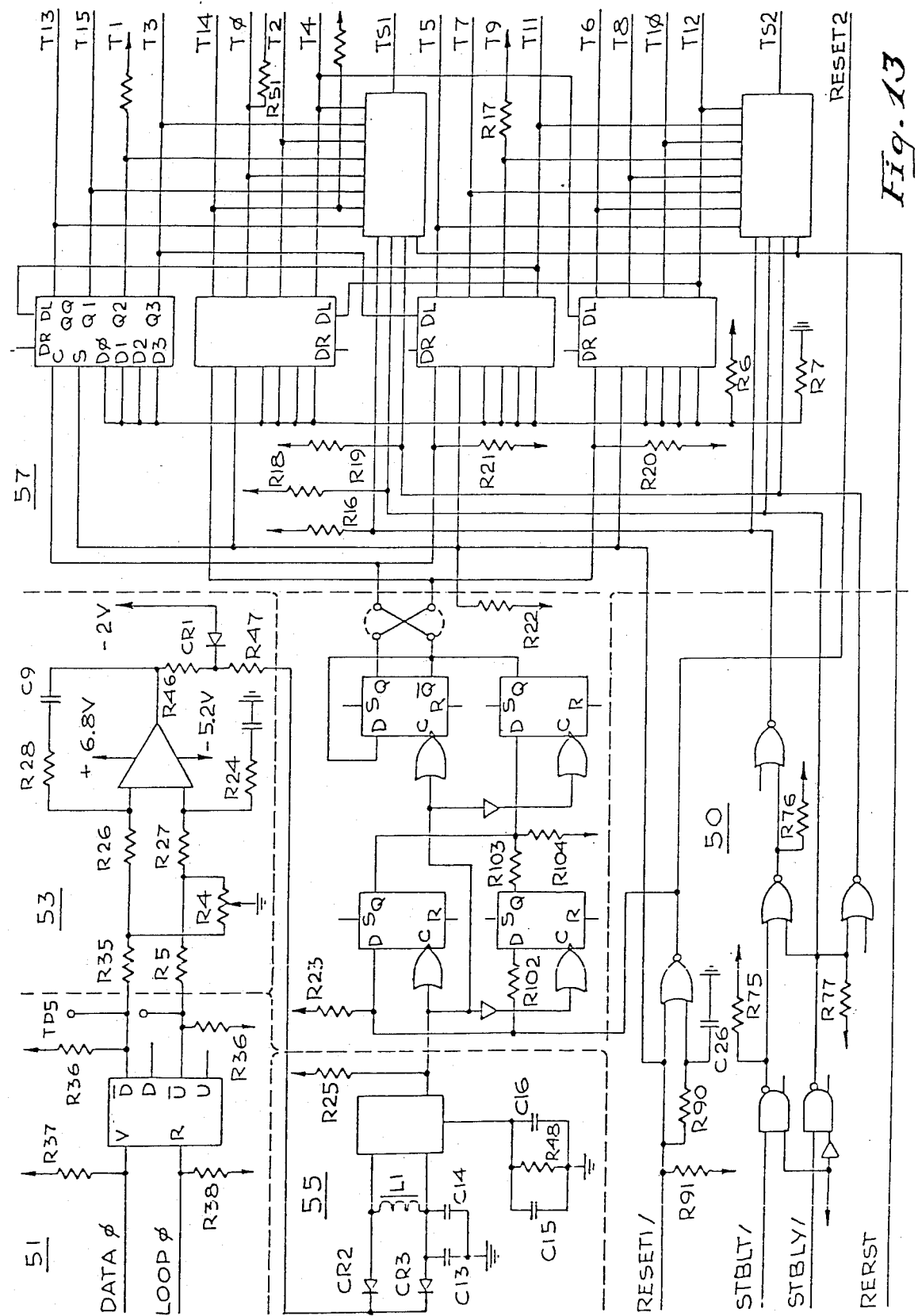

A "PL Start" unit 74 is provided to initiate the Phase-Lock Loop operation, for instance, restarting PLL when a "blatant error" is detected (e.g., loss of phase lock), then overriding Select unit 73, and commanding Detector 51 to "restart", with generator 57 thus being cleared via Reset unit 76 and re-synchronized on the servo clock signals. The effect will be to insert a new 16-pulse TP train at the corrected VCO frequency, as known in the art. A preferred circuit implementing these functions of phase detection, filtering, VCO and timing-pulse generation is indicated in FIG. 13.

In the "normal" case (no phase difference), the output from Detect unit 51 will be applied, through filter 53 to maintain the VCO "clock" 55 running at a standard nominal rate (here, 170 MHz. preferred) and thus initiate timing pulses (T-O through T-16 from TPG unit 57 as known in the art). However, a shift in phase will operate to accelerate (or decelerate) clock 55 as known in the art so as to reduce the phase-difference to zero, thus correcting any phase variance and maintaining synchronism of the timing-pulses and more accurate ZERO/ONE detection.

Conventionally, such a Phase-Lock Loop will compare the VCO output with the appropriate reference signal (e.g. servo or clock signals) and reconcile any phase difference as it develops. Here, however, in addition, the PLL-TPG combination serves to properly, uniformly distribute timing pulses across variable-width data cell (periods), despite shifting cell phase and width. That is, the sixteen-pulse output from timing pulse generator 57—according to another feature hereof—is adapted to present any array of 16 timing pulses that are distributed uniformly across the time frame of a "data cell" despite changes in cell width (time) and phase shifts. The mentioned phasing control, in combination with adjustable clock 55, will operate as a "Phase-Lock Loop" (PLL) stage to assure that these (sixteen) timing pulses will always fall regularly spaced within the variable-width data cell, no matter how wide the cell grows or how narrow it contracts—for instance, accommodating changes in disk speed and other read-out variations well known to workers.

The preferred implementation utilizes an ECL phase comparator which requires that the VCO output be converted to a replica of the reference input, using a time delay which reflects the misalignment of the 16-pulse train TP with the data cell boundaries. When the reference input is random data, it is necessary to "pre-read" the data in order to construct the replica from the pulse train TP. This "preread" is accomplished with the "0" or "1" Phase Select unit 73.

Upon reference source switching, the initial phase error between the reference source cell and the 16-pulse train can be instantaneously corrected to within 1/16 of a cell period by resetting and loading the shift registers associated with TPG (unit 57) to align the pulse train with the cell boundaries.

The generation of the timing-pulse (strobe) train may obviously be used in various ways for decoding, for prestressing, for initial detection of data phase and for later correction of phase-error. Workers will recognize advantages over prior art methods—e.g., where a VCO frequency charge was required to correct for initial phase errors. Workers will recognize that this feature can also save record space where, for instance, the "preamble" or each data field may be reduced by all but eliminating a phase sync reference (—thus reducing valuable "overhead" bit space).

PREFERRED SCHEMATIC CIRCUITS

FIGS. 8-14, indicating preferred circuit implementation of various elements functionally indicated above, have been discussed above, here, and elsewhere, it will be understood that standard "computer-logic symbols" are used and, except as otherwise indicated, that known components (resistors, gates, registers, etc.) are to be employed.

CONCLUSION

This invention will be seen as teaching a novel improved strobe arrangement; one characterized by such features as:

improved bit decoding, characterized by a Phase-Lock Loop which phase reference (16) timing pulses uniformly across a data cell. Such a technique allows implementation of a novel digital strobe select feature (early, late and "on time" data strobe for MFM-NRZ conversion), as well as an instantaneous phase error correction upon reference source switching, (and so significantly reducing the required "overhead").

In yet another feature related to the time pulse reference, conversion of MFM-NRZ write data is effected, while automatically accommodating a signal prestressing in order to compensate for bit shifts.

It will be understood that the preferred embodiments described herein are only exemplary and that the invention is capable of many modifications and variations in construction, arrangements and use, without departing from the spirit of the invention as claimed herein. For example, the means and methods disclosed herein are also applicable to other magnetic media, such as flexible disk files, as well as other related digital recording systems wherein recording transducers are automatically operated at high speeds and under comparable control.

Since the foregoing examples of the invention are only illustrative, it will be appreciated that this invention is to be considered as including all possible modifications and variations coming within its scope nd spirit as represented by the appended claims.

What is claimed is:

1. In a magnetic recording system including a prescribed read/write arrangement involving digital data signals, the combination therewith of an improved strobe means adapted to generate a selectable number of timing pulses as a "strobe chain" and to adjustably and uniformly distribute them across a "data cell" of variable length, and to provide timing-sampling means adapted to accommodate such "data cells", whereby to facilitate improved sub-cell sampling and data detection.

2. The combination as recited in claim 1, wherein said "data cell" and associated sampling strobe pulses are produced and controlled by timing pulse generator means adapted to generate 10 or more timing pulses and associated cell length adjust means; and wherein said strobe means is further adapted to distribute said 10 or more timing pulses uniformly across each "data cell".

3. The combination as recited in claim 2, wherein said cell length adjust means comprises a Phase-Lock Loop circuit adapted to adjust cell length automatically in accord with system parameters.

4. The combination as recited in claim 3, wherein said circuit comprises a variable clock oscillator circuit.

5. The combination as recited in claim 1, wherein said strobe means comprises a timing pulse generator means and strobe-clock means adapted for digital strobe pulse selection.

6. The combination as recited in claim 5, as combined with conversion means adapted to convert data signals from MFM to NRZ code and cell-normalizing pulse-stretch means.

7. The combination as recited in claim 6, as adapted to provide selection of "early", "late" or "on-time" strobing.

8. The combination as recited in claim 5, wherein said strobe means is re-phase-able and comprises phase detect means and a voltage controlled clock means adapted to re-phase the "strobe chain" to accommodate shifting data-cell width, redistributing the strobe pulses uniformly across each new cell width.

9. The combination as recited in claim 8, wherein said strobe means comprises phase detect means and an associated re-phase-able clock-loop, said loop comprising VC oscillator means, related timing pulse generator means and phase-select means adapted to provide comparison input to said phase detect means.

10. The combination as recited in claim 8, as comprised in a digital, selectable strobe adapted for "early", "late" or "on-time" strobe selection.

11. The combination as recited in claim 10, as further adapted for instantaneous phase-error correction, responsive to reference source switching.

12. The combination as recited in claim 9, wherein said strobe means further comprises phase-lock-start means, servo clock means and associated re-sync means adapted to resynchronize said generator means with said servo clock means.

13. The combination as recited in claim 5, wherein said strobe means comprises phase compare means adapted to phase-reference with a prescribed reference input, and related clock means, said clock means including a VC oscillator and related timing means adapted to convert VCO output to a replica of said reference input.

14. The combination as recited in claim 13, wherein said timing means further includes time-delay means adapted to modify said strobe chain phase to correct for misalignment thereof with the boundaries of a given data-cell.

15. The combination as recited in claim 13, wherein is further included "pre-read means" adapted to construct said replica input from said strobe chain and including "ZERO/ONE phase-select" means.

16. A magnetic recording system including an improved read/write arrangement operating according to given parameters and adapted to produce digital data signals in terms of a prescribed normalized "data cell" length and characterized by pulse stretching means adapted to adjust the length/duration of said data cells in response to prescribed changes in said system parameters, together with timing-sampling means adapted to accommodate such variable-length "data cells".

17. The combination as recited in claim 16, as combined with adjustable gain means adapted to automatically adjust read-out gain according to bit location radially on the magnetic record.

18. The combination as recited in claim 17, as operatively associated with improved crossover detection means adapted to produce an MFM-NRZ conversion of the digital data signals so produced.

19. The combination as recited in claim 16, comprising first means for adjusting the width of said "data cells", said first means being operated in conjunction with extraneous control means.

20. The combination as recited in claim 19, as combined with improved crossover detection means adapted to yield MFM digital data signals.

21. The combination as recited in claim 20, wherein said crossover detection means further includes associated threshold adjust means adapted to normalize signal amplitude.

22. The combination as recited in claim 21, wherein said crossover detection means is associated with signal prestress means adapted to discriminate against error signals according to their pulse width.

23. The combination as recited in claim 16, as combined with amplitude-referenced coder means adapted to convert between MFM and NRZ digital code and including normalizing pulse-stretch means in operative combination with associated timing pulse generation means and varible-clock oscillator means.

24. The combination as recited in claim 19, wherein said control means is adapted to compensate for any prescribed erroneous, noise-induced shifts of each digital read-out signal.

25. The combination as recited in claim 24, wherein there is further included pulse generating means adapted to generate a train of at least ten (10) associated sub-cell strobing signals to accommodate the selective sampling of prescribed, selectable portions of each "data cell".

26. The combination as recited in claim 25, wherein the width of each data cell and the distribution of said sub-cell strobing signals is controlled automatically with Phase-Lock Loop circuit means.

27. The combination as recited in claim 26, wherein said circuit means comprises a VCO clock circuit.

28. The combination as recited in claim 27, wherein there is further included improved bit detection means characterized by "pre-stressing means" automatically adapted to pre-stress data pulses so as to compensate for an error-inducing shift thereof.

29. The combination as recited in claim 19 as combined with a duration-controlled strobe stage adapted to generate timing pulses and distribute them uniformly across each "data cell" of whatever cell length.

30. The combination as recited in claim 16 as combined with code conversion means adapted to convert signals between MFM and NRZ code, while automatically accommodating signal pre-stress and pulse stretching so as to compensate for shifts in amplitude or phase.

* * * * *

UNITED STATES PATENT AND TRADEMARK OFFICE
CERTIFICATE OF CORRECTION

PATENT NO.   :   4,544,964
DATED        :   October 1, 1985
INVENTOR(S)  :   Kenneth R. Burns and Robert L. Hazel It is certified that error appears in the above-identified patent and that said Letters Patent is hereby corrected as shown below:

```
Col.  1, line 37, change "introducers" to --introduces--.
Col.  4, line 15, change ""cync"" to --"sync"--;
         line 36, change "tion" to --sm--.
Col.  5, line 33, change "of" to --in--;
         line 34, change "undrstood" to --understood--;
         line 36, change "KRZ" to --NRZ--;
         line 37, change ""pro-" to --"pre- --.
Col.  9, line  5, change "or" to --of--;
         line 48, change "nd" to --and--.
Col. 11, line 28, change "varible-clock" to --variable-clock--.
```

Signed and Sealed this

Fourth Day of March 1986

[SEAL]

Attest:

DONALD J. QUIGG

Attesting Officer

Commissioner of Patents and Trademarks